Dec. 15, 1953

O. STEINER 2,662,456

FRONT SUPPORT MEMBERS AND BELLOWS MOUNTING MEANS FOR PHOTOGRAPHIC CAMERAS

Original Filed May 1, 1947

INVENTOR.
OSCAR STEINER
BY
ATTYS.

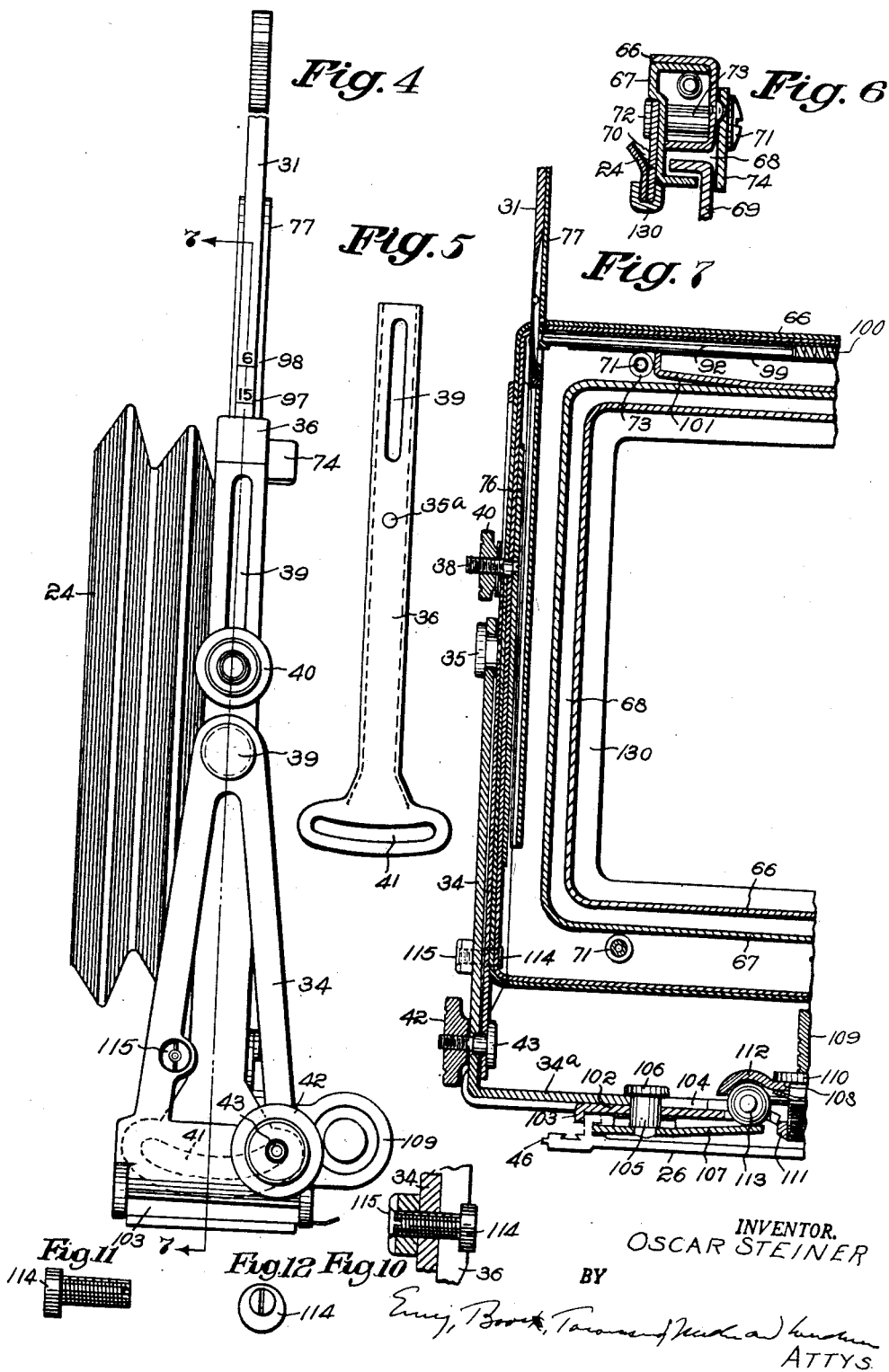

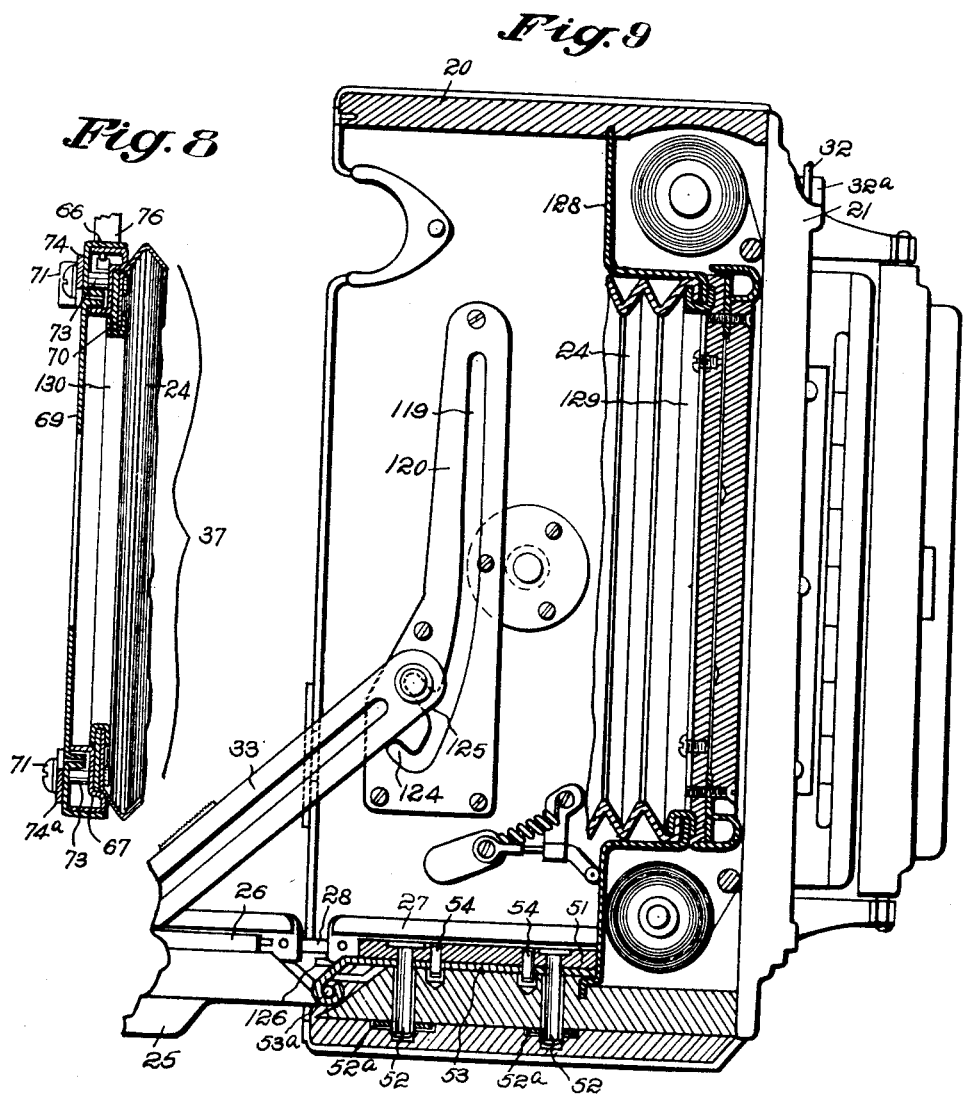

Patented Dec. 15, 1953

2,662,456

UNITED STATES PATENT OFFICE 2,662,456

FRONT SUPPORT MEMBERS AND BELLOWS MOUNTING MEANS FOR PHOTOGRAPHIC CAMERAS

Oscar Steiner, Rochester, N. Y., assignor to Graflex, Inc., Rochester, N. Y., a corporation of Delaware Original application May 1, 1947, Serial No. 745,182, now Patent No. 2,575,197, dated November 13, 1951. Divided and this application November 25, 1949, Serial No. 129,320

9 Claims. (Cl. 95—50)

This application is a division of my co-pending application Ser. No. 745,182, filed May 1, 1947, now Patent No. 2,575,197.

This invention relates to front support members and bellows mounting means for photographic cameras.

In order that the principle of the invention may be readily understood, I have disclosed a single embodiment thereof in the accompanying drawings wherein—

Fig. 3 is an elevation of the camera front mounted on the camera track, the track being removed from the camera bed;

Fig. 4 is an enlarged detail in elevation of the camera front;

Fig. 5 is a detail on a reduced scale of one of the swing members;

Fig. 6 is a sectional detail through Fig. 2 on the line 6—6 thereof;

Fig. 7 is a vertical section through Fig. 4 on the line 7—7 thereof;

Fig. 8 is a section through Fig. 3 on the line 8—8 thereof, clearly showing the construction of the camera front lens board support and showing the lens board in place;

Fig. 9 is a vertical section through the camera box, clearly showing the construction of the bellows frame and the mounting of the bellows thereto;

Figs. 10, 11 and 12 are details of the means for accurately positioning the camera front.

While not limited to such type, the invention herein disclosed is a folding camera of the character shown in the United States patents to Oscar Steiner, No. 2,233,354, February 25, 1941, No. 2,264,777, December 2, 1941, and No. 2,282,263, May 5, 1942.

The camera box of a folding type of camera is shown at 20, and upon it is mounted a camera back member 21 which need not be fully described herein. Attached to the camera box 20 is a shutter plate 22 which need not be described herein. The shutter release member is indicated at 23, the camera bellows at 24. The camera bed is indicated at 25, the camera front track at 26 and the camera rear track at 27.

Figure 1:
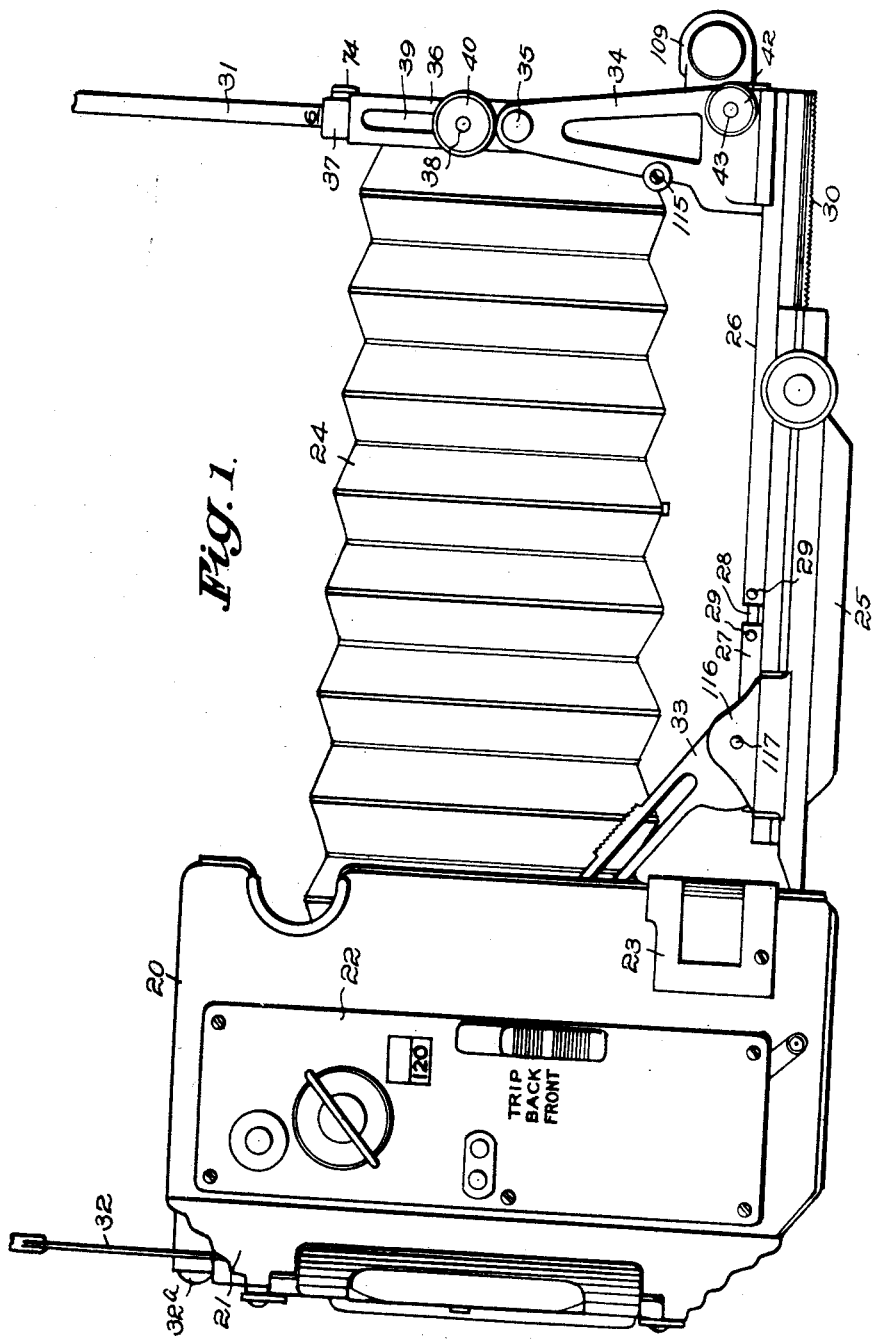
Fig. 1 is a right-hand side elevation of the camera showing it in open condition and the bellows fully extended.
Figure 2:
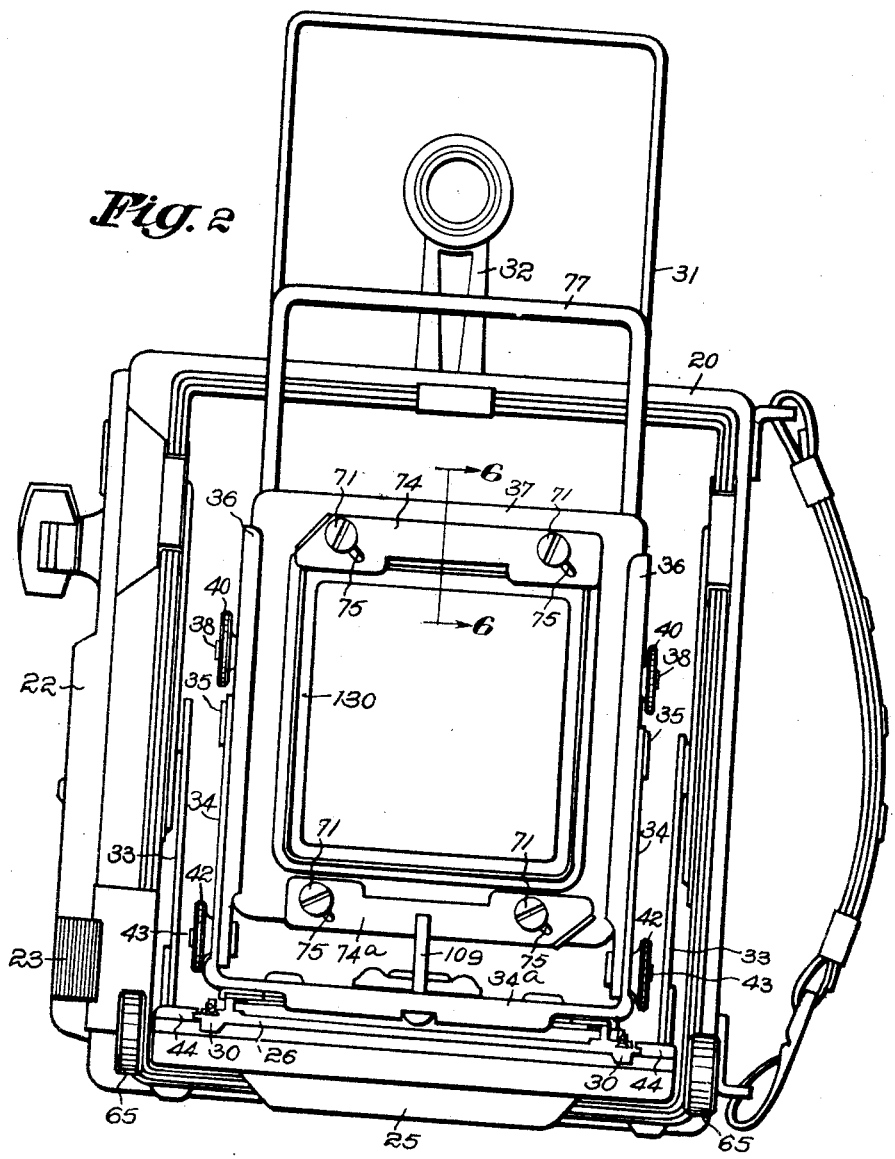
Fig. 2 is a front elevation of Fig. 1.

The camera tracks 26 and 27 are tied together by means of a pair of links 28, 28 having pivots 29, 29. The camera track 26 is provided with two racks 30, to be referred to more fully subsequently. A front view finder sliding member is shown at 31, a view finder peep sight at 32, and bed supporting side arms at 33, 33. Mounted upon the front track 26 are front support members 34, 34 having a U-formation, as shown in Fig. 2. Attached to said members 34 by means of rivets 35, 35 are swing members 36, 36, best shown in Figs. 4 and 5, having a channel formation in which is carried a lens board support member indicated generally at 37 in Fig. 2, and provided with studs 38 that pass through grooves or slots 39 in said swing members 36, as shown in Fig. 5. The lens board support member 37 can be adjusted in a vertical direction and can be locked in place by clamp nuts 40, 40, Fig. 1. The swing members are pivoted at the shoulder rivets 35 and are free to rotate thereon within the limits of a slot 41 in the lower end of each of the swing members 36, as shown in Fig. 5. The swing members 36 are clamped in any desired or selected position by means of the two clamp nuts 42 threaded onto studs 43, as shown in Figs. 2 and 7.

The front track 26 is held in position on the bed 25 by means of rails 44, 44 provided with grooves into which keys 46 of the front track member fit. The rear track 27 is provided with rails 51, 51 that are held to the camera box 20 by rivets 52, 52 and washers 52a, Fig. 9. The rivets 52 also retain the rear hinged member 53 that is connected to the bed 25 by a hinge pin 53a, Fig. 9. The rails 51 are provided with dowels 54, 54 properly to position the rails 51 to the hinged member 53.

Referring to Figs. 3 and 4 to 8, the lens board support member, indicated generally at 37 in Figs. 2, 3 and 8, is made up of two pan-shaped members 66, 67, best illustrated in Figs. 6, 7 and 8, which may also be described as being each of general rectangular form in section across the camera with meeting peripheral edges, as shown in Fig. 6, being a section on the line 6—6 of Fig. 2. The said members 66, 67 each has the form of a rectangular frame or open square, best evident from Figs. 3, 6, 7 and 8. It will be noted that the two rectangularly-shaped open members 66, 67 have meeting peripheral edges that are each at a right angle to the body portions of said members from which they extend and occupy telescoping relation with respect to each other.

It will be noted that in Fig. 6 there is a space provided between the inner edge of the outer pan-shaped member 66 and the inner edge of the inner or rear pan-shaped member 67. This provides a groove 68, shown in Fig. 7 also, into which is fitted the lens board 69. A bellows mounting plate or member is also fitted to the lens board support member 37 and is indicated at 70, Figs. 6, 7 and 8. The pan-shaped members 66 and 67 and the bellows mounting plate or member 70 are held together by a series of shoulder screws 71 and nuts 72. The pan-shaped members 66 and 67 are suitably held apart by spacers 73. Also held to the lens board support member 37 by the shoulder screw 71 are the upper and lower lens board locking members or slide locks 74 and 74a, Figs. 3 and 8, having angular slots 75 to guide the said locking members or slide locks 74 and 74a into position for locking the lens board. The locking member 74a is shown in Fig. 3 in unlocked condition and the locking member 74 is shown in Fig. 3 in the locked condition. In order to put the lens board in place, the locking member 74 is moved to the left, viewing Fig. 2, and the locking member 74a is moved to the right. When the lens board is in place, the locking member 74 is moved to the right, viewing Fig. 2, and the locking member 74a is moved to the left. Due to the angularity of the slots 75, the locking members 74 and 74a will be caused to move in an inward direction, thus clamping the lens board in place.

In Fig. 3, the slide lock or locking member 74 is, as stated, shown in locked condition, and the slide lock or locking member 74a is in the unlocked condition. To the vertical walls of the lens board support member 37, formed by the pan-shaped members 66 and 67, are attached opposite reinforcing members 76, shown in Fig. 7, and to said reinforcing member 76 is attached a stud 38, Fig. 7, previously referred to. Each said stud 38 passes through holes in the pan-shaped members 66 and 67 into the grooves or slots 39 in the swing members 36 and provides means for attaching the lens board support member 37 to the swing members 36. The lens board support member 37 can be moved in a vertical direction by loosening the nuts 40, 40 and moving the entire lens board support assembly in a vertical direction within the distance established by the grooves or slots 39 and then can be held in that position by the clamp nuts 40.

In Fig. 2 is shown a metal frame view finder made up of two U-shaped members. The upper U-shaped member 31, previously referred to, collapses into a second U-shaped member 77. In Fig. 2, the view finder is shown in the erected condition for use, wherein the U-shaped member 31 has been extended, as has also the U-shaped member 77, and the peep sight member 32, previously referred to, has been placed in the erected position. The said peep sight member 32 is pivoted on a screw 32a on the camera back, as shown in Figs. 1 and 9. The construction is such that the peep sight member 32 can be rotated about such screw 32a to a folded position.

The U-shaped member 77 is of a channel formation and the U-shaped member 31 is fitted into the said channel, as most clearly shown in Fig. 4. When the U-shaped member 31 has been assembled with the U-shaped member 77, they are fitted to openings in the lens board support member 37, as most clearly shown in Fig. 7.

On the U-shaped member 31, there are marked certain index lines of which there are shown in Fig. 4 the line 97 corresponding to the fifteen-foot position and the line 98 corresponding to the six-foot position. Each of the two detents 92 is provided with a housing 99, Fig. 7, made as a short tube and into which is fitted the corresponding detent 92, one on either side of the camera, the left one only being shown. A coil spring 100 tends to force the detents 92 in an outward direction to engage the holes provided therefor in the U-shaped member 77. Each tube 99 is held in position by a spring member 101, most clearly shown in Fig. 7.

As previously stated, the front support members 34, 34 are of a U-shaped formation, as most clearly shown in Fig. 3. The two vertical arms 34, 34 are tied together by a cross or horizontal member 34a which has also built thereto a clamp mechanism for clamping the camera front to the front track 26.

Again referring to Fig. 7, underneath the cross member 34a is a plate 102 having downwardly extending portions on both sides of the camera and indicated at 103, 103. Fitted into a suitable hole in the plate 102 and projecting through a slot 104 of the cross member 34a is a shoulder rivet 105 having a head 106. To the lower end of the said shoulder rivet 105 is attached a clamp member 107. While only one such clamp member 107 is shown, there is one on each side of the camera. Mounted on the cross member 34a is a cam or clamp plate 108 having a lever handle 109. The cam or clamp plate 108 is provided with a shoulder screw 110 that passes through said cam or clamp plate 108 and through the plate 102, and on its lower end is fitted a nut 111. The cam or clamp plate 108 is provided with indentations or recesses 112 into which are fitted balls 113, Fig. 7. When the cam or clamp plate 108 is in the position shown in Figs. 3 and 7, the balls 113 are in the indentations 112 of the cam or clamp plate 108, and the camera will be in unclamped position, and therefore can be moved along the front track 26, but when the lever handle 109 is turned either to the right or to the left, the balls 113 will be pushed downward out of the indentations 112 of the cam or clamp plate 108 and against the clamp member 107, thus clamping the camera front to the front track 26. An opening for the balls 113 is provided in the plate 102, as most clearly shown in Fig. 7.

It is desirable, with respect to a camera with a tilted front, as herein disclosed, to have means for positioning the front of the camera in parallel with the back thereof. To provide means of doing this very accurately, there is fitted into each front support 34 (Figs. 4, 7, 10, 11 and 12) a bolt having an eccentric head 114 that passes through such support members 34, the opposite end of which is provided with a nut 115. Since the head of the bolt 114 is in an eccentric position with respect to the body of the bolt when the bolt is turned, a different position will be assumed by the head of the bolt 114, thus providing means accurately to stop the swing member 36 when the correct position is found. The nut 115 is then tightened and the camera front will thus always be stopped in a direct vertical position (see Figs. 10, 11 and 12), because of the periphery of the head of the bolt 114 engages the side of the swing member 36.

Referring to Fig. 1, the side arms 33 are attached to ears 116, 116 of the camera bed 25 by means of rivets 117, 117. The side arm plate 120, Fig. 9, is provided at each side with tangent or offset grooves or formations 124, 125. As the camera is opened, the coiled side springs (not shown) cause the side arms 33 to be turned in a direction to engage the said tangent formations. When the groove or formation 125 is engaged, the camera bed will be in a horizontal position, and when the groove or formation 124 is engaged the camera bed will be at an angle below the horizontal with respect to the camera box 20, thus providing means for the use of wide angle lenses. When the camera bed is closed, it is held by a bed latch that is provided therefor and not herein shown.

Referring to Figs. 8 and 9, the camera box 20 is provided at the back with a bellows mounting plate 128 that is fitted into the said camera box and has an opening into which the bellows 24 is fitted, said bellows being held to the mounting plate 128 by a rectangular channel member 129 that securely clamps the bellows 24 to said plate 128. The front end of the bellows 24 is clamped to bellows mounting member 79 by means of a second rectangular member 130, Figs. 6 and 8. This provides a novel means for attaching a camera bellows to the front and the back of the camera and, at the same time, provides an absolutely light-tight construction.

Having thus described one illustrative embodiment of the invention, it is to be understood that although specific terms are employed, they are used in a generic and descriptive sense and not for purposes of limitation, the scope of the invention being set forth in the following claims.

I claim:

1. In a photographic camera of the folding type, a rectangular lens board having a peripheral flange extending substantially right angularly therefrom, and a rectangular lens board support member therefor, said lens board support member being composed of two rectangularly-shaped, open frame members, one of which is of slightly larger area than the other, for internesting together, and each having inner and outer peripheral flanges facing those of the other when the said two open frame members are positioned, the outer flanges of said two open frame members being telescoped upon and engaging each other in internesting relation, when positioned, and the inner flanges of said two open frame members, when positioned, being spaced sufficiently apart in radial directions, to receive between them said peripheral flanges of the said rectangular lens board, and means to secure together, internested, the said parts of said lens board support member with the said lens board held in its said position.

2. A photographic camera of the folding type in accordance with claim 1, wherein the nested frame members include walls between the peripheral flanges, said walls being spaced and parallel when the two frame members are in nested relationship, and wherein the means to secure together the said parts of the lens board support members in internested relation, consists of a series of screws extending through said walls of said two open frame members that are parallel when the said parts are in internested relation and wherein tubular spacers surround said screws between said parallel walls.

3. A photographic camera of the folding type in accordance with claim 1, wherein the nested frame members include walls between the peripheral flanges, said walls being spaced and parallel when the two frame members are in nested relationship, and wherein the means to secure together the said parts of the lens board support members in internested relation, consists of a series of screws extending through said walls of said two open frame members that are parallel when the said parts are in internested relation and wherein upper and lower lens board locking members are provided upon said lens board support members for removably securing the lens board to said lens board support members and which locking members are secured to said lens board support members by a plurality of said screws.

4. A photographic camera of the folding type in accordance with claim 1, wherein the nested frame members include walls between the peripheral flanges, said walls being spaced and parallel when the two frame members are in nested relationship, and wherein the means to secure together the said parts of the lens board support members in internested relation, consists of a series of screws extending through said walls of said two open frame members that are parallel when the said parts are in internested relation, and wherein there is a bellows mounting plate secured flatwise against one of said two open frame members by a plurality of said screws.

5. A photographic camera of the folding type in accordance with claim 1, wherein the nested frame members include walls between the peripheral flanges, said walls being spaced and parallel when the two frame members are in nested relationship, and wherein the means to secure together the said parts of the lens board support members in internested relation, consists of a series of screws extending through said walls of said two open frame members that are parallel when the said parts are in internested relation, and wherein there is a bellows mounting plate of open rectangular form, secured flatwise against the smaller of said two open frame members by a plurality of said screws.

6. A photographic camera of the folding type, in accordance with claim 1, wherein there are upright front support members, wherein each of the lens board support members has two spaced parallel upright walls, and wherein each of the upright walls of the said lens board support members is provided with an upright reinforcing member, having a stud passing therethrough and also passing through the upright portions of said two open frame members of said lens board support member and extending into the front support members, thereby attaching said lens board support member to the said front support members.

7. A photographic camera of the folding type, in accordance with claim 1, wherein there are upright front support members, wherein each of the lens board support members has two spaced parallel upright walls and wherein each of the upright walls of the said lens board support members is provided with an upright reinforcing member, having a stud passing therethrough and also passing through the upright portions of said two open frame members of said lens board support member and extending into the front support members, thereby attaching said lens board support member to the said front support members, and wherein said studs are threaded and have clamp nuts thereon, and wherein said front support members have each a vertical slot, to receive respectively said screws, whereby upon loosening said nuts the entire lens board support assembly may be moved vertically and be held in desired vertical position upon tightening said clamp nuts.

8. A photographic camera of the folding type, in accordance with claim 1, having front support members, each having an upright member at the outside thereof, each of the lens board support members having two spaced parallel upright walls and each of the upright walls of the said lens board support members being provided with an upright reinforcing member, having a stud passing therethrough and also passing through the upright portions of said two open frame members of said lens board support member and extending into the members of the front support members, thereby attaching said lens board support member to the said front support members, the said studs being threaded and having clamp nuts thereon, and each front support member having a vertical slot, to receive respectively said studs, whereby upon loosening said nuts the entire lens board support assembly may be moved vertically and be held in desired vertical position upon tightening said clamp nuts.

9. A photographic camera of the box type, in accordance with claim 1, wherein there is a front standard and a camera box and a bellows between the camera box and the front standard, and wherein there is provided means for connecting one end of the bellows to the front standard, said means including a bellows mounting member 70 carried by the front standard, and consisting of a rectangular plate having a relatively large opening therethrough so as to provide an open, narrow-walled frame, and an open frame channel member 130, the channel walls whereof engage and hold in face-to-face relation the inner edge of the said member 70 and the adjoining edge of the bellows.

OSCAR STEINER.

References Cited in the file of this patent

UNITED STATES PATENTS

| Number | Name | Date |
|---|---|---|
| 694,181 | Odguist | Feb. 25, 1902 |
| 1,192,696 | Smith | July 25, 1916 |
| 1,219,801 | Borman | Mar. 20, 1917 |
| 1,833,459 | Green | Nov. 24, 1931 |
| 1,873,927 | Goldhammer | Aug. 23, 1932 |
| 2,005,417 | Fuerst | June 15, 1935 |
| 2,165,346 | Crumrine | July 11, 1939 |
| 2,183,989 | Drotning | Dec. 19, 1939 |
| 2,257,081 | Whitman | Sept. 23, 1941 |
| 2,282,263 | Steiner | May 5, 1942 |
| 2,293,598 | Drucker | Aug. 18, 1942 |
| 2,482,629 | Little | Sept. 20, 1949 |
| 2,502,402 | Hineline | Mar. 28, 1950 |

FOREIGN PATENTS

| Number | Country | Date |
|---|---|---|
| 23,436 | Great Britain | of 1903 |
| 387,249 | Germany | Dec. 28, 1923 |